United States Patent
Cartier et al.

(10) Patent No.: US 8,322,363 B2
(45) Date of Patent: Dec. 4, 2012

(54) FUEL TANK SYSTEM

(75) Inventors: Anthony Cartier, Beauvais Cedex (FR); Vincent Chauvel, St. Gilles (FR); Geoffroy Husson, Ceintrey (FR)

(73) Assignee: Agco SA, Beauvais (FR)

( * ) Notice: Subject to any disclaimer, the term of this patent is extended or adjusted under 35 U.S.C. 154(b) by 309 days.

(21) Appl. No.: 12/809,614

(22) PCT Filed: Nov. 26, 2008

(86) PCT No.: PCT/EP2008/010003
§ 371 (c)(1),
(2), (4) Date: Jun. 21, 2010

(87) PCT Pub. No.: WO2009/080173
PCT Pub. Date: Jul. 2, 2009

(65) Prior Publication Data
US 2010/0269915 A1    Oct. 28, 2010

(30) Foreign Application Priority Data
Dec. 22, 2007 (GB) .................................. 0725176.2

(51) Int. Cl.
*B60K 15/06* (2006.01)
(52) U.S. Cl. ........................................ 137/265; 137/263
(58) Field of Classification Search .................. 137/255, 137/256, 263, 265, 267, 561, 571, 602, 861; 222/129
See application file for complete search history.

(56) References Cited

U.S. PATENT DOCUMENTS

| | | | | |
|---|---|---|---|---|
| 4,288,086 A | * | 9/1981 | Oban et al. | 280/834 |
| 4,552,175 A | * | 11/1985 | Schiemann | 137/571 |
| 4,664,144 A | * | 5/1987 | Lemmon | 137/571 |
| 2005/0061365 A1 | * | 3/2005 | Chung | 137/38 |

FOREIGN PATENT DOCUMENTS
WO   WO2004/009391 A   *   1/2004
* cited by examiner

*Primary Examiner* — John Rivell
*Assistant Examiner* — Seth W Mackay-Smith

(57) ABSTRACT

A fuel tank system for a vehicle (1) such as a tractor comprises a first compartment (28) and a second compartment (29) located on a first side of the vehicle. A third compartment (8) is located on a second side of the vehicle opposite the first side and a first pipe (10) is connected between an aperture (12) in the first compartment and an aperture (14) in the third compartment, wherein the first pipe (10) includes a one-way valve (16) which allows fuel to flow from the third compartment (8) to the first compartment (28). A second pipe (20) is connected between an aperture (22) in the second compartment (29) and a junction (25) in the first pipe (10). The junction (25) is intermediate the one-way valve (16) and the third compartment (8) allowing fuel to flow to the third compartment (8) from the second compartment (29). The fuel is extracted from the first compartment (28) and means are provided to allow fuel to overflow from the first compartment (28) to the second compartment (29) when the fuel is above a predetermined level. By providing a T junction (25) in the first pipe (10), only one fuel aperture is required in the third compartment (8).

19 Claims, 2 Drawing Sheets

FUEL TANK SYSTEM

The invention relates to a fuel tank system for use on a vehicle, in particular, but not exclusively to, an agricultural vehicle such as a tractor.

Vehicles which are fuelled by liquid fuels such as diesel typically comprise a fuel tank from which the fuel is extracted from a region near to the bottom of the tank. Fuel tanks having relatively large horizontal sectional areas suffer from inefficient extraction of the entire fuel content of the tank, particularly when operating over uneven ground. As the level of fuel runs low, for example less than 10% of the tank volume, then the remaining fuel can collect on a side of the tank away from the extraction point running the risk of extracting air into the fuel intake.

The problem is exacerbated when multiple fuel tank systems are adopted wherein the fuel can flow between the tanks through connecting pipes. Such systems are common on large tractors for example which have one fuel tank located on the left side of the tractor and one on the right side. Tractors often yaw during work such as ploughing wherein the tractor may tilt to one side for prolonged periods. This may cause the remaining fuel to drain away, under gravity, from the extraction point as it collects in the opposite tank.

U.S. Pat. No. 4,664,144 discloses a multiple fuel tank arrangement having two tanks connected by a transfer line and a crossover line. The transfer line connects the bottom of the tanks and only allows fuel to flow into the fuel withdrawal tank. The crossover line is connected between openings in the respective tanks which are higher than those of the transfer line. Fuel is trapped in the fuel withdrawal tank when the level is below the height of the openings for the crossover line.

It is an object of the invention to provide an improved fuel tank system.

It is a further object of the invention to provide a fuel tank system which is simpler to install on a tractor.

In accordance with the present invention there is provided a fuel tank system for a vehicle, comprising a first compartment and a second compartment located on a first side of a vehicle, a third compartment located on a second side of the vehicle opposite the first side, a first pipe connected between an aperture in the first compartment and an aperture in the third compartment, the first pipe having a one-way valve which allows fuel to flow from the third compartment to the first compartment, and a second pipe connected between an aperture in the second compartment and a junction in the first pipe which is intermediate the one-way valve and the third compartment allowing fuel to flow from the second compartment to the third compartment, wherein the fuel is extracted from the first compartment and wherein fuel can overflow from the first compartment to the second compartment when the fuel is above a predetermined level. By simply providing a junction in the first pipe for connection to the second pipe, only a single opening is required in the third compartment. This delivers a significant cost saving in terms of expense of fabrication and ease of assembly.

Preferably, the junction is located on the first side of the vehicle. Advantageously only a single pipe is required to connect from one side of the vehicle to the other giving further cost savings, swifter assembly and more freedom to the vehicle designer.

In a first preferred embodiment, the first compartment and second compartment are defined within a tank. The aperture in the second compartment is located above the aperture in the first compartment, the height of which defines a boundary between the second compartment and the first compartment. Once the fuel level in the tank drops below the aperture in the second compartment, the remaining fuel is trapped in the tank, thereby reducing the risk of delivering air to the fuel intake of the engine. Such an arrangement is simple to fabricate and requires no modifications to a common fuel tank beyond providing the aperture in the second compartment.

In a second preferred embodiment wherein the first compartment and second compartment are defined within a tank, an internal wall in the tank defines a boundary between the first compartment and the second compartment, the boundary being generally parallel to the direction of spacing between the first tank and the third compartment. Advantageously, such an arrangement allows for biasing the fuel toward the first compartment from two dimensions. For example, the fuel can collect in a rearward portion of the tank reducing the risk of delivering air to the fuel intake of the engine when the vehicle is travelling downhill.

The internal wall may extend upwardly from the bottom of the tank for a portion of the height which defines the predetermined level. This carries the benefit that the fuel level can balance itself between the three compartments when the volume of fuel is greater than the volume of the first compartment.

The second pipe may advantageously comprise a one-way valve allowing fuel to flow from the second compartment to the junction. Therefore, at low fuel levels fuel is prevented from flowing back into the second compartment thereby biasing all of the available fuel towards the first compartment. Such a second one-way valve is particularly beneficial when employed in combination with an internal wall in a tank comprising the first compartment and the second compartment. In this case, a one-way circuit flow of fuel is encouraged which, for higher fuel levels, effectively balances the fuel load across the vehicle in two dimensions but, for lower fuel levels, biases the fuel towards the first compartment from where the fuel is extracted.

Preferably the volume of the first compartment is less than the volume of the second compartment. Preferably further still, the first compartment has a smaller horizontal sectional area than the second compartment. Advantageously, this lowers the risk of the extraction pipe drawing air from the tank.

Embodiments of the invention will now be described by way of example with reference to the drawings, wherein.

Figure 1:
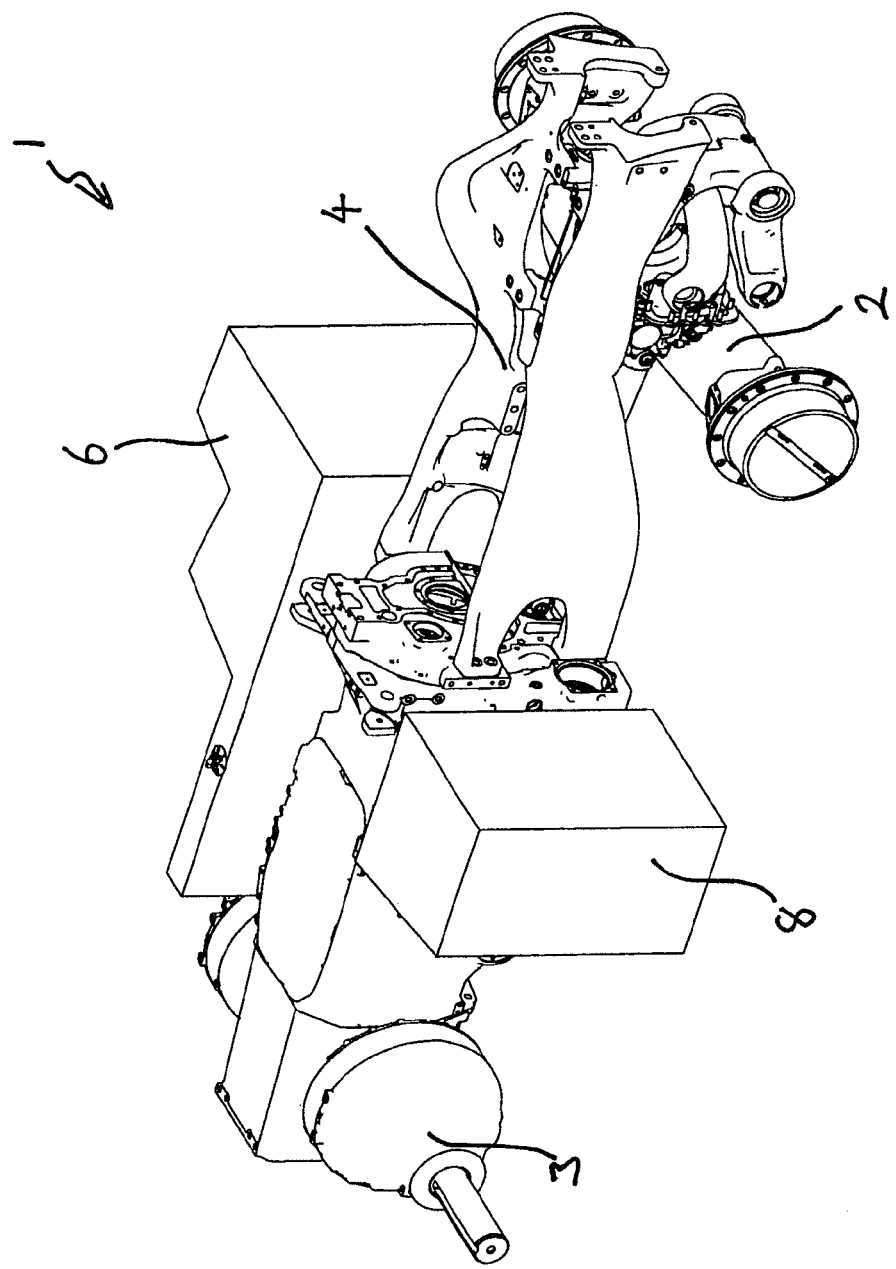
FIG. 1 is a perspective view of part of a tractor having a fuel tank system in accordance with a first embodiment of the invention.

In a first embodiment a tractor 1, shown in FIG. 1 without a cab and wheels for the sake of simple explanation, comprises a fuel tank system. The tractor 1 further comprises a front axle 2 and a rear axle 3 mounted on a chassis 4. The fuel tank system comprises a first tank 6 located on the left hand side of the tractor 1, and a second tank 8 located on the right hand side. Fuel is extracted from a fuel extraction aperture 9 located substantially at the bottom of the first tank 6.

Figure 2:
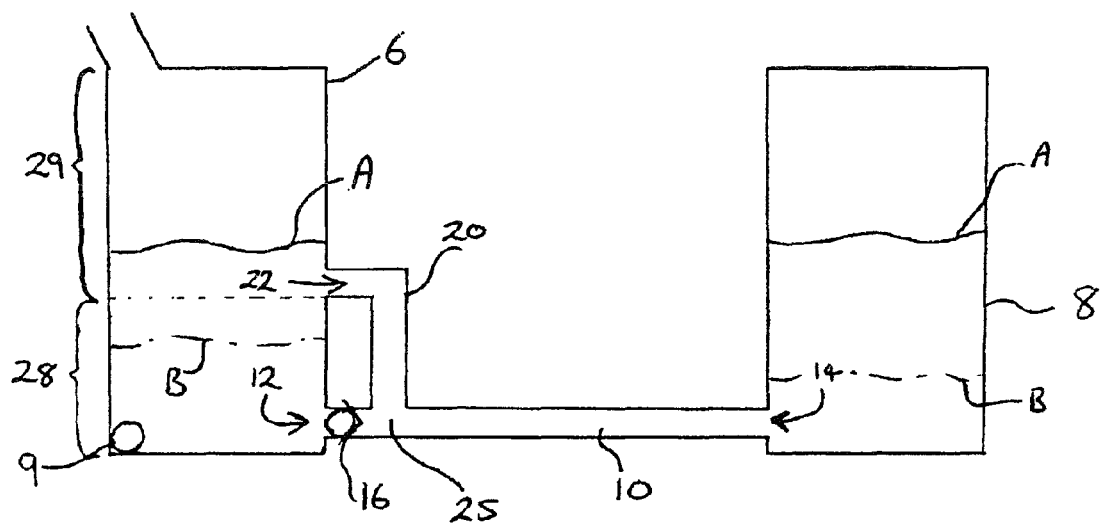
FIG. 2 is a schematic rear view of the fuel tank system of FIG. 1.

With reference to FIG. 2, the fuel tank system comprises a first pipe 10 connected between a first aperture 12 in the first tank 6 and an aperture 14 in the second tank 8. The first aperture 12 is located towards the bottom of the inward facing sidewall of the first tank 6. The first pipe 10 has an internal bore of about 50 mm. A one-way valve 16 is positioned in series in the first pipe 10 towards the left hand side of the tractor 1. The one-way valve 16 allows fuel to flow from the second tank 8 to the first tank 6. It should be appreciated that one of various forms of known one-way valves can be employed in the first pipe 10.

A tank breather (not shown) is provided in each of the tanks to maintain a steady pressure thereby avoiding restricted movement of the fuel between the tanks caused by a pressure differential.

Fuel is prevented from flowing from the first tank 6 to the second tank 8 by the one-way valve 16. Advantageously, this biases fuel to collect in the first tank 6 when the overall fuel level is relatively low when compared to the overall volume of the tanks combined. As the tractor tilts to the left, fuel can freely flow under gravity from the second tank 8 to the first tank 6. However, when the tractor tilts to the right, fuel is effectively trapped in the first tank 6, thereby reducing the risk of air being extracted through the extraction aperture 9 potentially causing damage to the engine. Ploughing is an example application where tractors can tilt alternately to the left and to the right, typically at 7.5° to the horizontal and as much as 20°, for prolonged periods of time.

A second pipe 20 is connected between a second aperture 22 in the first tank 6 and a junction 25 in the first pipe 10. The junction 25 is conveniently positioned on the left hand side of the tractor 1 intermediate the one-way valve 16 and the second tank 8. Fuel can, therefore, flow freely in both directions between the second aperture 22 and the aperture 14 in the second tank 8.

The second aperture 22 is located in a sidewall of the first tank 6 above the first aperture 12 and defines a generally horizontal boundary (indicated by a dashed line in FIG. 2) between a first compartment 28 and a second compartment 29 in the first tank 6.

When the fuel level in the first tank is above the second aperture 22, referenced at A as an example in FIG. 2, the fuel can flow freely to the second tank 8 thus balancing the fuel load across both sides of the tractor 1. However, when the fuel level drops below the second aperture 22, referenced at B by way of example, the fuel is confined to the first compartment 28. When the tractor pitches to the left, fuel can still flow under gravity from the second tank to the first tank 6 via the one-way valve. This can result in the fuel level in the first tank 6 being higher than that in the second tank 8, as shown by level B.

Figure 3:
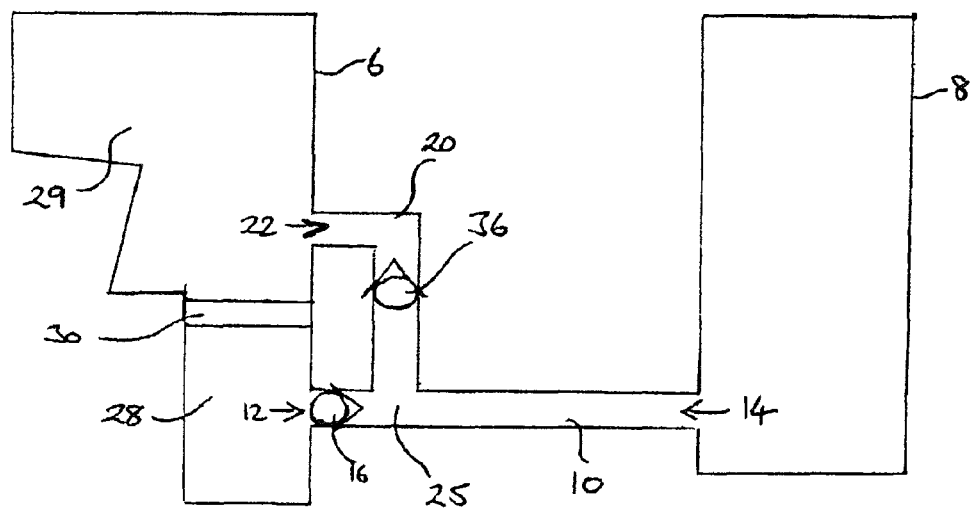
FIG. 3 is a schematic plan view of a fuel tank system in accordance with a second embodiment of the invention.

With reference to FIG. 3 (plan view), a second embodiment again comprises a first tank 6 and a second tank 8. A first pipe 10 is connected from a first aperture 12 in the first tank 6 to an aperture 14 in the second tank 8. A one-way valve 16 allows fuel to flow from the second tank 8 to the first tank 6, but not vice-versa.

The first tank comprises an internal wall 30 which defines a boundary between a first compartment 28 and a second compartment 29. The internal wall 30 is generally parallel to the direction of spacing between the first tank 6 and the second tank 8, that is generally transverse to the longitudinal axis of the tractor 1. The first tank 6 and the internal wall 30 are conveniently formed from a single plastic moulding.

The internal wall 30 extends upwardly from the bottom of the first tank 6 for a portion of the height. This allows fuel to flow over the wall in either direction between the first compartment 28 and the second compartment 29 when the tractor slopes uphill or downhill for example. Advantageously for relatively high fuel levels, this delivers a distribution and balancing of the fuel load in a longitudinal direction. Furthermore, the first tank can be entirely filled through a filler (not shown) located in either portion of the tank 6.

A second pipe 20 is connected between a second aperture 22 in the first tank 6 and a junction 25 in the first pipe 10. The junction 25 is positioned on the left hand side of the tractor 1 intermediate the one-way valve 16 and the second tank 8. The second aperture 22 is located in a sidewall of the first tank 6 toward the bottom of the second compartment 29.

A further one-way valve 36 is disposed in series in the second pipe 20 allowing fuel to flow from the second compartment 29 to the junction 25. Therefore, for higher fuel levels, the fuel is free to distribute itself over the three compartments 28, 29, 8 in response to yaw and incline of the tractor during operation. However, when the fuel level in the first compartment drops below the height of the internal wall 30, then the remaining fuel is biased toward the first compartment 28 from both of the other compartments 29, 8, respectively located longitudinally and laterally relative to the first compartment 28.

The volume of the first compartment 28 is less than 50% of the volume of the second compartment 29. Furthermore, the horizontal sectional area of the first compartment 28 is significantly less than that of the second compartment 29 and second tank 8. This simply reduces the risk of exposing the extraction aperture to air.

It should be appreciated that the height of the internal wall 30 defines the volume of the first compartment 29. It is envisaged that the wall 30 can instead extend to the top of the first tank 6. However, in this case, in order to exploit the total volume of the fuel tank system, the fuel should be injected through a filler in the second compartment 29. In the absence of a further one-way valve 36, the fuel tank system can be filled through a filler aperture (not shown) in the second tank 8. Alternatively, a pipe can be connected at the predetermined height between respective apertures in the first compartment 28 and the second compartment 29.

Although the embodiments described above in accordance with the invention comprise two compartments being housed in a single tank on the left hand side of the tractor, it is envisaged that the first compartment 28 and second compartment 29 can be located remote from one another and connected by respective pipes for example, without deviating from the scope of the invention. This delivers greater flexibility to a designer who may wish to position separate fuel tanks in multiple available locations around the body of the tractor.

In an alternative fuel tank system the second pipe is connected between the second compartment 29 and a further aperture in the second tank 8.

In summary, there is provided a fuel tank system for a vehicle, such as a tractor, which comprises a first compartment and a second compartment located on a first side of the vehicle. A third compartment is located on a second side of the vehicle opposite the first side and a first pipe is connected between an aperture in the first compartment and an aperture in the third compartment, wherein the first pipe includes a one-way valve which allows fuel to flow from the third compartment to the first compartment. A second pipe is connected between an aperture in the second compartment and a junction in the first pipe. The junction is intermediate the one-way valve and the third compartment allowing fuel to flow to the third compartment from the second compartment. The fuel is extracted from the first compartment and means are provided to allow fuel to overflow from the first compartment to the second compartment when the fuel is above a predetermined level. By providing a T junction in the first pipe, only one fuel aperture is required in the third compartment.

Various modifications to those embodiments described above, which remain within the scope of the invention, will be apparent to the skilled person.

The invention claimed is:

1. A fuel tank system for a vehicle, comprising a first compartment and a second compartment located on a first side of a vehicle, a third compartment located on a second side of the vehicle opposite the first side, a first pipe connected between an aperture in the first compartment and an aperture in the third compartment, the first pipe having a one-way valve which allows fuel to flow from the third compartment to the first compartment, and a second pipe connected between an aperture in the second compartment and a junction in the first pipe which is intermediate the one-way valve and the third compartment allowing fuel to flow to the third compartment from the second compartment, wherein the fuel is extracted from the first compartment and wherein fuel can overflow from the first compartment to the second compartment when the fuel is above a predetermined level.

2. A system according to claim 1, wherein the junction is located on the first side of the vehicle.

3. A system according to claim 1, wherein the first compartment and second compartment are defined within a tank.

4. A system according to claim 3, wherein said aperture in the second compartment is located above the aperture in the first compartment, the height of which defines a boundary between the second compartment and the first compartment.

5. A system according to claim 3, wherein an internal wall in the tank defines a boundary between the first compartment and the second compartment, the boundary being generally parallel to the direction of spacing between the first tank and the third compartment.

6. A system according to claim 5, wherein the internal wall extends upwardly from the bottom of the tank for a portion of the height which defines the predetermined level.

7. A system according to claim 1, wherein the second pipe comprises a one-way valve allowing fuel to flow from the second compartment to the junction.

8. A system according to claim 1, wherein the volume of the first compartment is less than the volume of the second compartment.

9. A system according to claim 8, wherein the volume of the first compartment is less than 50% of the volume of the second compartment.

10. A system according to claim 2, wherein the first compartment and second compartment are defined within a tank.

11. A system according to claim 2, wherein the second pipe comprises a one-way valve allowing fuel to flow from the second compartment to the junction.

12. A system according to claim 3, wherein the second pipe comprises a one-way valve allowing fuel to flow from the second compartment to the junction.

13. A system according to claim 5, wherein the second pipe comprises a one-way valve allowing fuel to flow from the second compartment to the junction.

14. A system according to claim 6, wherein the second pipe comprises a one-way valve allowing fuel to flow from the second compartment to the junction.

15. A system according to claim 2, wherein the volume of the first compartment is less than the volume of the second compartment.

16. An apparatus, comprising:
a tractor; and
a fuel tank system, comprising,
a first compartment and a second compartment located on a first side of a vehicle, a third compartment located on a second side of the vehicle opposite the first side, a first pipe connected between an aperture in the first compartment and an aperture in the third compartment, the first pipe having a one-way valve which allows fuel to flow from the third compartment to the first compartment, and a second pipe connected between an aperture in the second compartment and a junction in the first pipe which is intermediate the one-way valve and the third compartment allowing fuel to flow to the third compartment from the second compartment, wherein the fuel is extracted from the first compartment and wherein fuel can overflow from the first compartment to the second compartment when the fuel is above a predetermined level.

17. A system according to claim 16, wherein the junction is located on the first side of the vehicle.

18. A system according to claim 16, wherein the first compartment and second compartment are defined within a tank.

19. A system according to claim 18, wherein said aperture in the second compartment is located above the aperture in the first compartment, the height of which defines a boundary between the second compartment and the first compartment.

* * * * *